US009620342B2

(12) United States Patent
Cox

(10) Patent No.: US 9,620,342 B2
(45) Date of Patent: Apr. 11, 2017

(54) INTERLACING TO IMPROVE SAMPLING OF DATA WHEN RAMPING PARAMETERS

(71) Applicant: DH TECHNOLOGIES DEVELOPMENT PTE. LTD., Singapore (SG)

(72) Inventor: David Michael Cox, Toronto (CA)

(73) Assignee: DH Technologies Development Pte. Ltd., Singapore (SG)

( * ) Notice: Subject to any disclaimer, the term of this patent is extended or adjusted under 35 U.S.C. 154(b) by 114 days.

(21) Appl. No.: 14/443,936

(22) PCT Filed: Nov. 21, 2013

(86) PCT No.: PCT/IB2013/002613
§ 371 (c)(1),
(2) Date: May 19, 2015

(87) PCT Pub. No.: WO2014/096916
PCT Pub. Date: Jun. 26, 2014

(65) Prior Publication Data

US 2015/0311051 A1 Oct. 29, 2015

Related U.S. Application Data

(60) Provisional application No. 61/740,380, filed on Dec. 20, 2012.

(51) Int. Cl.
*B01D 59/44* (2006.01)
*H01J 49/00* (2006.01)
(Continued)

(52) U.S. Cl.
CPC ........ *H01J 49/0036* (2013.01); *H01J 49/004* (2013.01); *H01J 49/0031* (2013.01); *H01J 49/26* (2013.01)

(58) Field of Classification Search
USPC .......................................... 250/281–283, 292
See application file for complete search history.

(56) References Cited

U.S. PATENT DOCUMENTS 7,554,339 B2 * 6/2009 Horton .................. G01N 27/72 324/627
8,138,961 B2 * 3/2012 Deshpande ........... G01S 13/286 342/118

(Continued)

FOREIGN PATENT DOCUMENTS

JP 08-129002 A 5/1996
JP 2009-158106 A 7/2009

OTHER PUBLICATIONS

International Search Report and Written Opinion for PCT/IB2013/002613, mailed Apr. 22, 2014.

*Primary Examiner* — Bernard Souw
(74) *Attorney, Agent, or Firm* — John R. Kasha; Kelly L. Kasha; Kasha Law LLC

(57) ABSTRACT

Systems and methods are provided for interlacing ramped mass spectrometer parameter values during data acquisition. Ions from a sample are acquired within a cycle time, Ct, using a mass spectrometer. Within each Ct, two or more scans of the acquired ions are performed using two or more ramped values for a parameter of the mass spectrometer. When it is determined that scans for a desired range of ramped parameter values cannot be performed within Ct, the desired range of ramped values is divided into at least two interlaced groups of ramped values. The mass spectrometer is instructed to perform scans for each of the interlaced groups within two or more cycle times. Spectra from the scans for each of the at least two interlaced groups are combined. The ramped parameter values of the combined spectra have the desired range and the desired effective step size.

15 Claims, 4 Drawing Sheets

(51) Int. Cl.
*H01J 49/42* (2006.01)
*H01J 49/26* (2006.01)

(56) References Cited

U.S. PATENT DOCUMENTS

| | | | | |
|---|---|---|---|---|
| 2005/0116162 | A1 | 6/2005 | Vestal | |
| 2007/0090287 | A1 | 4/2007 | Foote et al. | |
| 2008/0127756 | A1 * | 6/2008 | Horton | G01N 27/72 73/866 |
| 2010/0245163 | A1 * | 9/2010 | Deshpande | G01S 13/286 342/25 F |
| 2010/0276586 | A1 * | 11/2010 | Senko | H01J 49/429 250/283 |

* cited by examiner

INTERLACING TO IMPROVE SAMPLING OF DATA WHEN RAMPING PARAMETERS

CROSS REFERENCE TO RELATED APPLICATION

This application claims the benefit of U.S. Provisional Patent Application Ser. No. 61/740,380, filed Dec. 20, 2012, the content of which is incorporated by reference herein in its entirety.

INTRODUCTION

In mass spectrometry or mass spectrometry coupled with a separation technique, the fragmentation or the separation of a compound may be dependent upon a parameter of the mass spectrometer or the separation device. As a result, it is important to be able to vary the values of the parameter over time, or ramp the parameter. By ramping the parameter, it is possible to map out a parameter for one or more compounds of interest.

However, when ramping a fragmentation or separation parameter, the time it takes to acquire data often limits how many steps of this ramped parameter that can be obtained in order to cover a desired range. Consequently, there is often not enough time between steps to acquire adequate spectral data. In other words, for one or more compounds, it is difficult to acquire data fast enough to fully characterize the effect of ramping a separation or fragmentation parameter.

SUMMARY

A system is disclosed for interlacing ramped mass spectrometer parameter values during data acquisition in order to maintain a desired range and step size for the values. The system includes a mass spectrometer and a processor. The mass spectrometer is capable of repeatedly acquiring ions from a sample within a cycle time, Ct. Also, the mass spectrometer is capable of performing, within each Ct, two or more scans of the acquired ions using two or more ramped values for a parameter of mass spectrometer. Each of the two or more scans occurs within a step time, St, and each of the two or more ramped values vary by a step size, Ss.

The processor calculates if scans for a desired range of ramped values for the parameter can be performed within the cycle time, Ct, of the mass spectrometer. The processor performs the calculation using the desired range of ramped values, step time, St, and step size, Ss. If the scans for the desired range cannot be performed within Ct, the processor divides the desired range of ramped values into at least two interlaced groups of ramped values. Each of the ramped values in each of the at least two interlaced groups of ramped values vary by a step size of at least 2Ss. The processor instructs the mass spectrometer to perform scans for each of the at least two interlaced groups within two or more separate cycle times. Finally, the processor combines spectra from the scans for each of the at least two interlaced groups. Combined spectra for the two or more separate cycle times are produced that span the desired range and have an effective step size of Ss across the desired range.

A method is disclosed for interlacing ramped mass spectrometer parameter values during data acquisition in order to maintain a desired range and step size for the values. Ions from a sample are repeatedly acquired within a cycle time, Ct, using a mass spectrometer. Within each Ct, two or more scans of the acquired ions are performed using two or more ramped values for a parameter of the mass spectrometer.

Each of the two or more scans occurs within a step time, St, and each of the two or more ramped values vary by a step size, Ss.

A calculation is made to determine if scans for a desired range of ramped values for the parameter can be performed within Ct using the desired range of ramped values, St, and Ss and using a processor. If it is determined that scans for the desired range cannot be performed within Ct, the desired range of ramped values is divided into at least two interlaced groups of ramped values using the processor. Each of the ramped values in each of the at least two interlaced groups of ramped values vary by a step size of at least 2Ss.

The mass spectrometer is instructed to perform scans for each of the at least two interlaced groups within two or more separate cycle times using the processor. Spectra from the scans for each of the at least two interlaced groups are combined using the processor. Combined spectra for the two or more separate cycle times are produced that span the desired range and have an effective step size of Ss across the desired range.

A computer program product is disclosed that includes a non-transitory and tangible computer-readable storage medium whose contents include a program with instructions being executed on a processor so as to perform a method for interlacing ramped mass spectrometer parameter values during data acquisition in order to maintain a desired range and step size for the values. In various embodiments, the method includes providing a system, wherein the system comprises one or more distinct software modules, and wherein the distinct software modules comprise a control module and an analysis module.

The control module instructs a mass spectrometer to repeatedly acquire ions from a sample within a cycle time, Ct. The control module also instructs the mass spectrometer to perform two or more scans of the acquired ions within each Ct using two or more ramped values for a parameter of the mass spectrometer. Each of the two or more scans occurs within a step time, St, and each of the two or more ramped values vary by a step size, Ss.

The analysis module calculates if scans for a desired range of ramped values for the parameter can be performed within Ct. The analysis module performs the calculation using the desired range of ramped values, St, and Ss.

If the scans for the desired range cannot be performed within Ct, The analysis module divides the desired range of ramped values into at least two interlaced groups of ramped values. Each of the ramped values in each of the at least two interlaced groups of ramped values vary by a step size of at least 2Ss. Then the control module instructs the mass spectrometer to perform scans for each of the at least two interlaced groups within two or more separate cycle times. The analysis module combines spectra from the scans for each of the at least two interlaced groups. The analysis module produces combined spectra for the two or more separate cycle times that span the desired range and have an effective step size of Ss across the desired range.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 1:
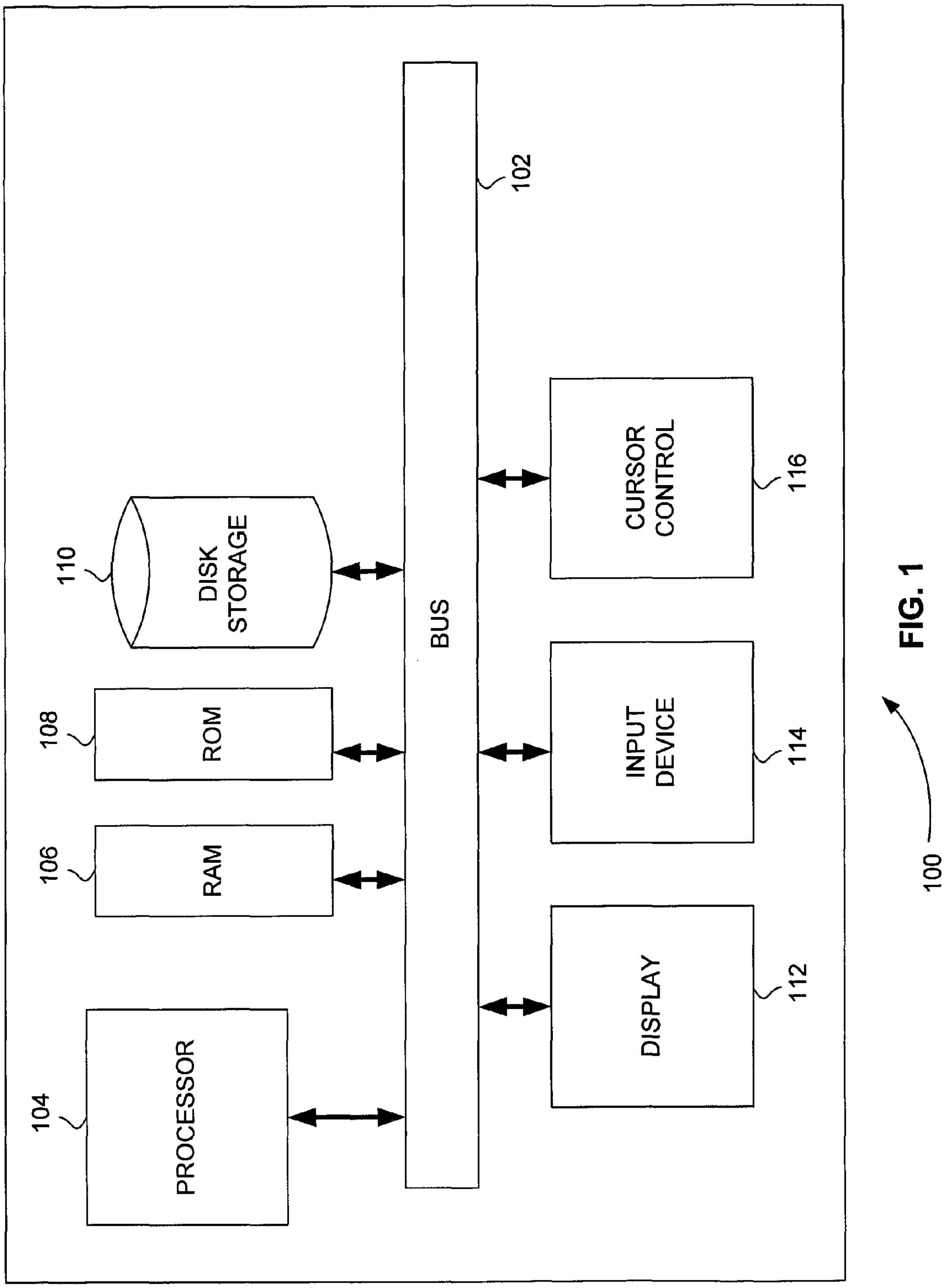
FIG. 1 is a block diagram that illustrates a computer system, upon which embodiments of the present teachings may be implemented.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively hard-wired circuitry may be used in place of or in combination with software instructions to implement the present teachings. Thus implementations of the present teachings are not limited to any specific combination of hardware circuitry and software.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Systems and Methods for Ramping a Parameter

As described above, in mass spectrometry it is often useful to map out a fragmentation or separation parameter of an instrument or device for one or more compounds of interest by ramping the parameter. However, when ramping a fragmentation or separation parameter, the time it takes to acquire data often limits how many steps of this ramped parameter that can be obtained in order to cover a desired range.

For example, when a separation device is used together with a fast liquid chromatography (LC) system, the ramping of a parameter of the separation device can become the limiting factor. One exemplary separation device is a differential mobility separation (DMS) device. Separations can be varied for one or more compounds using a DMS device by ramping the compensation voltage (CoV) of the DMS. When using a DMS device with liquid chromatography (LC), the speed at which data can be acquired at each step of the ramp is the limiting factor. In order to maintain an adequate cycle time for fast LC separations requires sacrificing the DMS separation range. The most common application of this workflow is combining a CoV ramp of the DMS with scans from a time-of-flight (TOF) instrument at each step during an LC acquisition. The resulting data can be used for qualitative analysis of compounds, analysis of unknowns, or optimization of DMS settings for quantitation on the TOF instrument.

The CoV parameter of the DMS affects how a compound is separated. It is not known beforehand how the separation of a particular compound varies with the CoV parameter. As a result, it is common to try to scan through a range of CoV values to determine the optimum value for one or more compounds, or to see how two different compounds separate. A brute force approach is to ramp the CoV parameter on every cycle across a range. However, as described above, it may not be possible to acquire data fast enough to adequately sample the ramp of the CoV parameter. Consequently, the ramping of the CoV parameter is conventionally performed with a larger step size or the range of CoV values is reduced.

In various embodiments, interlacing is used to maintain the effective step size and range of the ramp of a fragmentation or separation parameter. The interlacing allows the ramp of the fragmentation or separation parameter to effectively keep up with the acquisitions of a fast scanning instrument.

For example, the CoV ramp of a DMS device can be interlaced as follows. On cycle 1, CoVs of 0, 2, 4, 8, and 10 are acquired. On cycle 2, CoVs of 1, 3, 5, 7, 9, and 11 are acquired. Interlacing enables faster cycle times, while preserving a high resolution sampling of the CoV space. If it currently takes 2 seconds to ramp the CoV across the desired range, interlacing would enable the same CoV range to be covered in 1 second. Or put another way, this effectively increases the resolution in the CoV domain (smaller effective step size) without increasing cycle time.

Essentially, when the interlaced signals are combined, the combined signal has a higher resolution that the scanning rate. As long as the signal of the LC is not changing too quickly, the interlaced signals can be combined without significant error. As a result, interlacing is used to avoid the tradeoffs of a larger effective step size or a reduced range of CoV values.

Although interlacing of the ramping of a mass spectrometer parameter has been described with respect to a DMS device and the CoV parameter. The method is not limited to any device or instrument, and the parameter is not limited to any separation or fragmentation parameter. For example, interlacing can also be applied to the ramping of the collision energy parameter of a collision cell of a mass spectrometer.

System for Interlacing Ramped Mass Spectrometer Parameter Values

Figure 2:
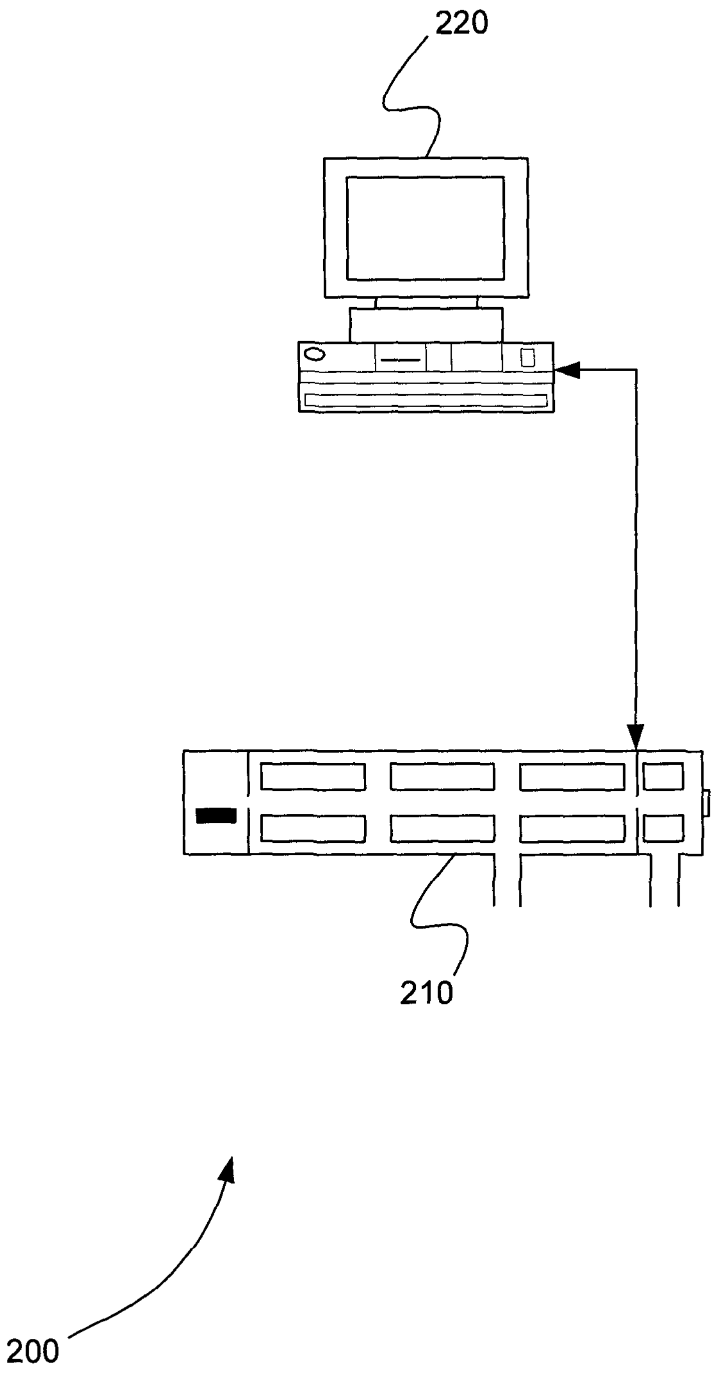
FIG. 2 is a schematic diagram showing a system for interlacing ramped mass spectrometer parameter values during data acquisition in order to maintain a desired range and step size for the values, in accordance with various embodiments.

FIG. 2 is a schematic diagram showing a system 200 for interlacing ramped mass spectrometer parameter values during data acquisition in order to maintain a desired range and step size for the values, in accordance with various embodiments. System 200 includes mass spectrometer 210 and processor 220.

Mass spectrometer 210 can include one or more physical mass analyzers that perform one or more mass analyses. A mass analyzer of a tandem mass spectrometer can include, but is not limited to, a time-of-flight (TOF), quadrupole, an ion trap, a linear ion trap, an orbitrap, or a Fourier transform mass analyzer. Mass spectrometer 210 can also include a one or more separation devices (not shown). The separation device can perform a separation technique that includes, but is not limited to, liquid chromatography, gas chromatography, capillary electrophoresis, or ion mobility. Mass spectrometer 210 can include separating mass spectrometry stages or steps in space or time, respectively.

Processor 220 can be, but is not limited to, a computer, microprocessor, or any device capable of sending and receiving control signals and data to and from mass spectrometer 210 and processing data. Processor 220 is in communication with mass spectrometer 210.

Mass spectrometer 210 is capable of repeatedly acquiring ions from a sample within a cycle time, Ct. Also, mass spectrometer 210 is capable of performing, within each Ct, two or more scans of the acquired ions using two or more ramped values for a parameter of mass spectrometer 210. Each of the two or more scans occurs within a step time, St, and each of the two or more ramped values vary by a step size, Ss. Ramped values for a parameter can be an increasing or decreasing series of values, for example.

In various embodiments, within each Ct mass spectrometer 210 performs two or more scans of the acquired ions using two or more ramped values for a parameter of a fragmentation device of mass spectrometer 210. The parameter affects the fragmentation of the acquired ions. The parameter can be a collision energy (CE) and the fragmentation device can be a collision cell of mass spectrometer 210, for example.

In various embodiments, within each Ct mass spectrometer 210 performs two or more scans of the acquired ions using two or more ramped values for a parameter of a separation device of mass spectrometer 210. The parameter affects the separation of the acquired ions. The parameter can be a compensation voltage (CoV) and the separation device can be a differential mobility (DMS) separation device of mass spectrometer 210, for example.

Processor 220 calculates if scans for a desired range of ramped values for the parameter can be performed within the cycle time, Ct, of mass spectrometer 210. Processor 220 performs the calculation using the desired range of ramped values, step time, St, and step size, Ss. A desired range for the ramped values is received from a user or generated by default by the processor, for example.

If the scans for the desired range cannot be performed within Ct, processor 220 divides the desired range of ramped values into at least two interlaced groups of ramped values. Each of the ramped values in each of the at least two interlaced groups of ramped values vary by a step size of at least 2Ss. Processor 220 instructs mass spectrometer 210 to perform scans for each of the at least two interlaced groups within two or more separate cycle times. Finally, processor 220 combines spectra from the scans for each of the at least two interlaced groups. Combined spectra for the two or more separate cycle times are produced that span the desired range and have an effective step size of Ss across the desired range. As a result, by interlacing the ramped values for the parameter there is no reduction in the desired range or effective step size of the ramped values.

Method for Interlacing Ramped Mass Spectrometer Parameter Values

Figure 3:
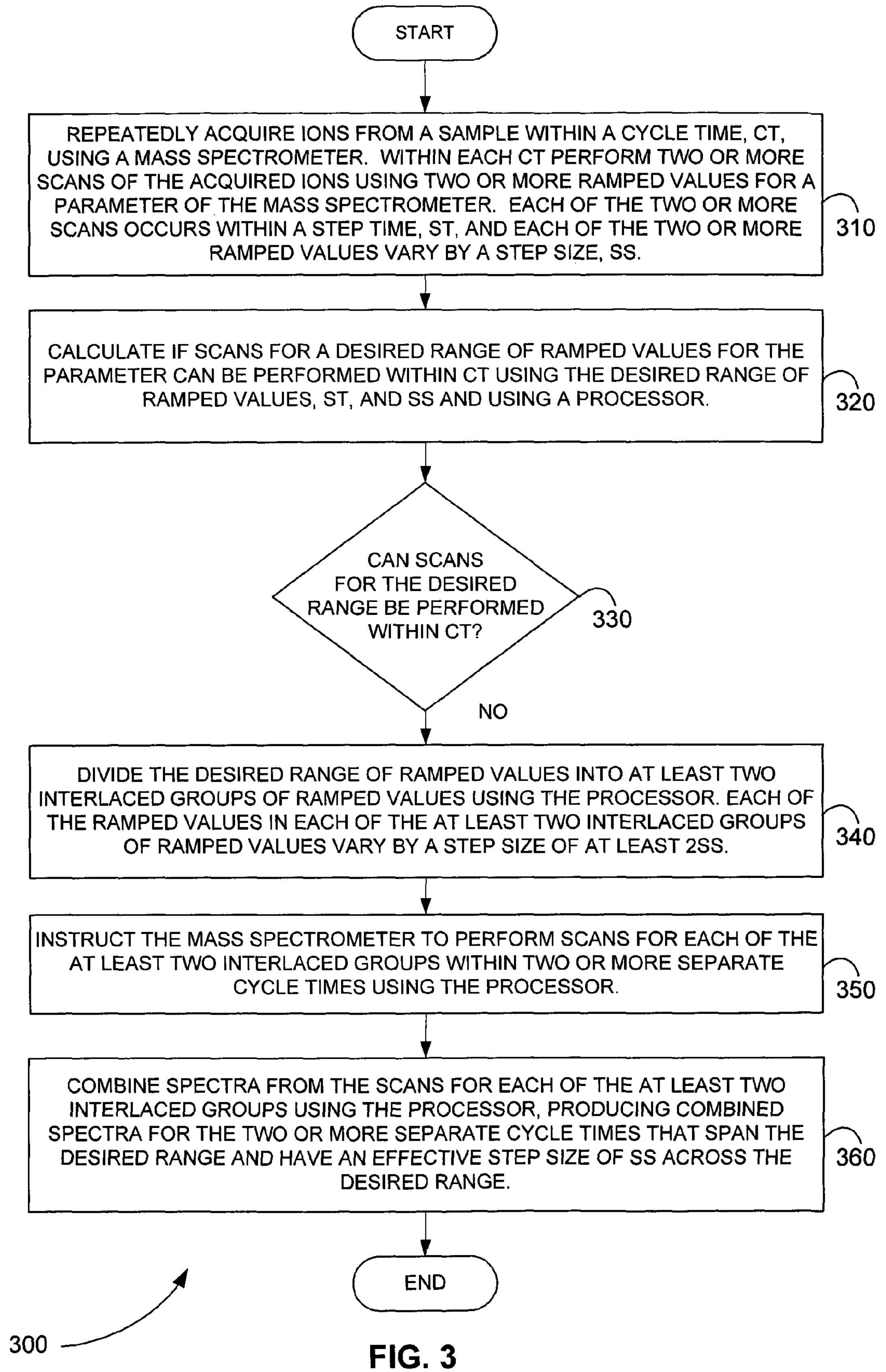
FIG. 3 is an exemplary flowchart showing a method for interlacing ramped mass spectrometer parameter values during data acquisition in order to maintain a desired range and step size for the values, in accordance with various embodiments.

FIG. 3 is an exemplary flowchart showing a method 300 for interlacing ramped mass spectrometer parameter values during data acquisition in order to maintain a desired range and step size for the values, in accordance with various embodiments.

In step 310 of method 300, ions from a sample are repeatedly acquired within a cycle time, Ct, using a mass spectrometer. Within each Ct, two or more scans of the acquired ions are performed using two or more ramped values for a parameter of the mass spectrometer. Each of the two or more scans occurs within a step time, St, and each of the two or more ramped values vary by a step size, Ss.

In step 320, a calculation is made to determine if scans for a desired range of ramped values for the parameter can be performed within Ct using the desired range of ramped values, St, and Ss and using a processor.

In step 330, it is determined that scans for the desired range cannot be performed within Ct.

In step 340, the desired range of ramped values is divided into at least two interlaced groups of ramped values using the processor. Each of the ramped values in each of the at least two interlaced groups of ramped values vary by a step size of at least 2Ss.

In step 350, the mass spectrometer is instructed to perform scans for each of the at least two interlaced groups within two or more separate cycle times using the processor.

In step 360, spectra from the scans for each of the at least two interlaced groups are combined using the processor. Combined spectra for the two or more separate cycle times are produced that span the desired range and have an effective step size of Ss across the desired range.

Computer Program Product for Interlacing Ramped Mass Spectrometer Parameter Values In various embodiments, computer program products include a tangible computer-readable storage medium whose contents include a program with instructions being executed on a processor so as to perform a method for interlacing ramped mass spectrometer parameter values during data acquisition in order to maintain a desired range and step size for the values. This method is performed by a system that includes one or more distinct software modules.

Figure 4:
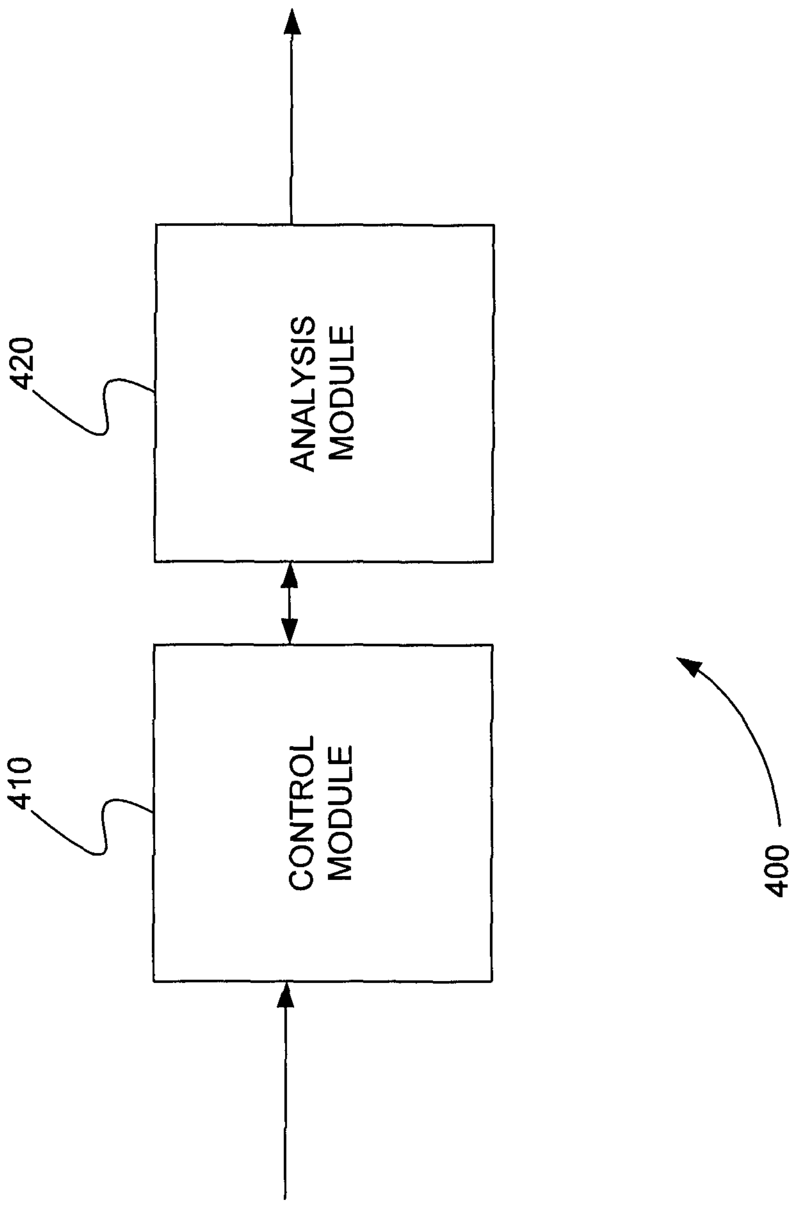
FIG. 4 is a schematic diagram of a system that includes one or more distinct software modules that performs a method for interlacing ramped mass spectrometer parameter values during data acquisition in order to maintain a desired range and step size for the values, in accordance with various embodiments.

FIG. 4 is a schematic diagram of a system 400 that includes one or more distinct software modules that performs a method for interlacing ramped mass spectrometer parameter values during data acquisition in order to maintain a desired range and step size for the values, in accordance with various embodiments. System 400 includes control module 410 and analysis module 420.

Control module 410 instructs a mass spectrometer to repeatedly acquire ions from a sample within a cycle time, Ct. Control module 410 also instructs the mass spectrometer to perform two or more scans of the acquired ions within each Ct using two or more ramped values for a parameter of the mass spectrometer. Each of the two or more scans occurs within a step time, St, and each of the two or more ramped values vary by a step size, Ss.

Analysis module 420 calculates if scans for a desired range of ramped values for the parameter can be performed within Ct. Analysis module 420 performs the calculation using the desired range of ramped values, St, and Ss.

If the scans for the desired range cannot be performed within Ct, analysis module 420 divides the desired range of ramped values into at least two interlaced groups of ramped values. Each of the ramped values in each of the at least two interlaced groups of ramped values vary by a step size of at least 2Ss. Then control module 410 instructs the mass spectrometer to perform scans for each of the at least two interlaced groups within two or more separate cycle times. Analysis module 420 combines spectra from the scans for each of the at least two interlaced groups. Analysis module 420 produces combined spectra for the two or more separate cycle times that span the desired range and have an effective step size of Ss across the desired range.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for interlacing ramped mass spectrometer parameter values during data acquisition in order to maintain a desired range and step size for the values, comprising:

- a mass spectrometer that repeatedly acquires ions from a sample within a cycle time, Ct, and within each Ct performs two or more scans of the acquired ions using two or more ramped values for a parameter of the mass spectrometer, wherein each of the two or more scans occurs within a step time, St, and each of the two or more ramped values vary by a step size, Ss, and
- a processor in communication with the mass spectrometer that
  - calculates if scans for a desired range of ramped values for the parameter can be performed within Ct using the desired range of ramped values, St, and Ss, and
  - if the scans for the desired range cannot be performed within Ct,
    - divides the desired range of ramped values into at least two interlaced groups of ramped values, wherein each of the ramped values in each of the at least two interlaced groups of ramped values vary by a step size of at least 2Ss,
    - instructs the mass spectrometer to perform scans for each of the at least two interlaced groups within two or more separate cycle times, and
    - combines spectra from the scans for each of the at least two interlaced groups producing combined spectra for the two or more separate cycle times that span the desired range and have an effective step size of Ss across the desired range.

2. The system of claim 1, wherein within each Ct the mass spectrometer performs two or more scans of the acquired ions using two or more ramped values for a parameter of a fragmentation device of the mass spectrometer that affects fragmentation of the acquired ions.

3. The system of claim 1, wherein the parameter comprises collision energy (CE) and the fragmentation device comprises a collision cell.

4. The system of claim 1, wherein within each Ct the mass spectrometer performs two or more scans of the acquired ions using two or more ramped values for a parameter of a separation device of the mass spectrometer that affects separation of the acquired ions.

5. The system of claim 1, wherein the parameter comprises a compensation voltage (CoV) and the separation device comprises a differential mobility (DMS) separation device.

6. A method for interlacing ramped mass spectrometer parameter values during data acquisition in order to maintain a desired range and step size for the values, comprising:

repeatedly acquiring ions from a sample within a cycle time, Ct, using a mass spectrometer and within each Ct performing two or more scans of the acquired ions using two or more ramped values for a parameter of the mass spectrometer, wherein each of the two or more scans occurs within a step time, St, and each of the two or more ramped values vary by a step size, Ss, calculating if scans for a desired range of ramped values for the parameter can be performed within Ct using the desired range of ramped values, St, and Ss and using a processor, and if the scans for the desired range cannot be performed within Ct, dividing the desired range of ramped values into at least two interlaced groups of ramped values using the processor, wherein each of the ramped values in each of the at least two interlaced groups of ramped values vary by a step size of at least 2Ss, instructing the mass spectrometer to perform scans for each of the at least two interlaced groups within two or more separate cycle times using the processor, and combining spectra from the scans for each of the at least two interlaced groups using the processor producing combined spectra for the two or more separate cycle times that span the desired range and have an effective step size of Ss across the desired range.

7. The method of claim 6, wherein within each Ct the mass spectrometer performs two or more scans of the acquired ions using two or more ramped values for a parameter of a fragmentation device of the mass spectrometer that affects fragmentation of the acquired ions.

8. The method of claim 6, wherein the parameter comprises collision energy (CE) and the fragmentation device comprises a collision cell.

9. The method of claim 6, wherein within each Ct the mass spectrometer performs two or more scans of the acquired ions using two or more ramped values for a parameter of a separation device of the mass spectrometer that affects separation of the acquired ions.

10. The method of claim 6, wherein the parameter comprises a compensation voltage (CoV) and the separation device comprises a differential mobility (DMS) separation device.

11. A computer program product, comprising a non-transitory and tangible computer-readable storage medium whose contents include a program with instructions being executed on a processor so as to perform a method for interlacing ramped mass spectrometer parameter values during data acquisition in order to maintain a desired range and step size for the values, the method comprising:

providing a system, wherein the system comprises one or more distinct software modules, and wherein the distinct software modules comprise a control module and an analysis module;

instructing a mass spectrometer to repeatedly acquire ions from a sample within a cycle time, Ct, and within each Ct to perform two or more scans of the acquired ions using two or more ramped values for a parameter of the mass spectrometer using the control module, wherein each of the two or more scans occurs within a step time, St, and each of the two or more ramped values vary by a step size, Ss, calculating if scans for a desired range of ramped values for the parameter can be performed within Ct using the desired range of ramped values, St, and Ss and using the control module, and if the scans for the desired range cannot be performed within Ct, dividing the desired range of ramped values into at least two interlaced groups of ramped values using the analysis module, wherein each of the ramped values in each of the at least two interlaced groups of ramped values vary by a step size of at least 2Ss, instructing the mass spectrometer to perform scans for each of the at least two interlaced groups within two or more separate cycle times using the control module, and combining spectra from the scans for each of the at least two interlaced groups using the analysis module producing combined spectra for the two or more separate cycle times that span the desired range and have an effective step size of Ss across the desired range.

12. The computer program product of claim 11, wherein within each Ct the mass spectrometer performs two or more scans of the acquired ions using two or more ramped values for a parameter of a fragmentation device of the mass spectrometer that affects fragmentation of the acquired ions.

13. The computer program product of claim 11, wherein the parameter comprises collision energy (CE) and the fragmentation device comprises a collision cell.

14. The computer program product of claim 11, wherein within each Ct the mass spectrometer performs two or more scans of the acquired ions using two or more ramped values for a parameter of a separation device of the mass spectrometer that affects separation of the acquired ions.

15. The computer program product of claim 11, wherein the parameter comprises a compensation voltage (CoV) and the separation device comprises a differential mobility (DMS) separation device.

* * * * *